United States Patent
Murgai et al.

(10) Patent No.: US 10,234,606 B2
(45) Date of Patent: Mar. 19, 2019

(54) NANO DIFFUSER

(71) Applicant: Raytheon Company, Waltham, MA (US)

(72) Inventors: Vijay Murgai, Irvine, CA (US); Eric C. Fest, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 74 days.

(21) Appl. No.: 14/615,562

(22) Filed: Feb. 6, 2015

(65) Prior Publication Data
US 2016/0231472 A1 Aug. 11, 2016

(51) Int. Cl.
*G02B 5/02* (2006.01)
*B82Y 20/00* (2011.01)

(52) U.S. Cl.
CPC ......... *G02B 5/0278* (2013.01); *G02B 5/0242* (2013.01); *G02B 5/0284* (2013.01); *B82Y 20/00* (2013.01); *G02B 2207/101* (2013.01)

(58) Field of Classification Search
CPC .. G02B 5/0278; G02B 5/0242; G02B 5/0284; G02B 5/0263; G02B 5/02; G02B 5/0236; G02B 5/0268; G02B 5/0226; G02B 6/102; G02B 27/0927; G02B 26/02; G02B 2207/101; B82Y 20/00; B29D 11/00788; B29D 11/00346; B29D 11/00798; H01L 21/02601; G02F 1/133504; Y10S 977/773; Y10S 977/755; Y10S 977/834
USPC .......................................... 359/599; 977/773
See application file for complete search history.

(56) References Cited

U.S. PATENT DOCUMENTS

| | | | |
|---|---|---|---|
| 6,741,394 B1 | 5/2004 | Tanitsu et al. | |
| 7,446,939 B2 | 11/2008 | Sharma et al. | |
| 7,612,942 B2* | 11/2009 | Sharma | C03C 8/14 359/361 |
| 8,236,200 B2* | 8/2012 | Sweeney | B82Y 30/00 252/301.4 F |
| 8,248,696 B2 | 8/2012 | Lines et al. | |
| 2003/0214812 A1* | 11/2003 | Bourdelais | G02B 5/0221 362/330 |
| 2009/0122409 A1 | 5/2009 | Sakata et al. | |
| 2010/0027105 A1* | 2/2010 | Sweeney | G02B 1/105 359/356 |
| 2010/0027125 A1 | 2/2010 | Sakaguchi et al. | |
| 2011/0315808 A1* | 12/2011 | Zelinski | B82Y 20/00 244/3.16 |

(Continued)

FOREIGN PATENT DOCUMENTS

CN 103154777 A 6/2013
JP 05066304 A 3/1993
(Continued)

OTHER PUBLICATIONS

R. R. Menezes, R.H.G.A. Kiminami. Microwave sintering of alumina-zirconia nanocomposites. journal of materials processing technology 2 0 3 ( 2008 ) 513-517.*

(Continued)

*Primary Examiner* — Collin X Beatty
(74) *Attorney, Agent, or Firm* — Cantor Colburn LLP

(57) ABSTRACT

A method of scattering light includes positioning a Nanocomposite Optical Ceramic (NCOC) diffuser to receive light and scattering the light with the NCOC diffuser. The NCOC diffuser is substantially Lambertian over a waveband range.

12 Claims, 4 Drawing Sheets

(56) References Cited

U.S. PATENT DOCUMENTS

| | | | |
|---|---|---|---|
| 2012/0292619 A1* | 11/2012 | Forbes | H01L 31/02363 257/53 |
| 2013/0208360 A1 | 8/2013 | Coggio et al. | |
| 2014/0205370 A1 | 7/2014 | Sunne et al. | |
| 2014/0231727 A1 | 8/2014 | Zelinski et al. | |
| 2014/0313574 A1* | 10/2014 | Bills | H02S 40/22 359/359 |

FOREIGN PATENT DOCUMENTS

| | | | |
|---|---|---|---|
| JP | 2009522618 A | 6/2009 | |
| WO | 2007114493 A1 | 11/2007 | |
| WO | 20100151381 A2 | 12/2010 | |
| WO | 2014017363 A1 | 1/2014 | |

OTHER PUBLICATIONS

Roy Henderson. web.archive.org/web/20071028072110/http://info.tuwien.ac.at/iflt/safety/section1/1_1_1.htm. Oct. 2007.*

DongTao Jiang, Amiya K. Mukherjee. Spark Plasma Sintering of an Infrared-Transparent Y2O3—MgO Nanocomposite. J. Am. Ceram. Soc., 93 [3] 769-773 (2010).*

Todd Stefanik, Richard Gentilman, Patrick Hogan, "Nanocomposite optical ceramics for infrared windows and domes," Proc. SPIE 6545, Window and Dome Technologies and Materials X, 65450A (May 2, 2007); doi: 10.1117/12.719312 (Year: 2007).*

PCT International Search Report and Written Opinion; International Application No. PCT/US2016/015953; International Filing Date: Feb. 1, 2016; dated May 13, 2016; pp. 1-10.

Harris, Daniel C., et al.; "Properties of an Infrared-Transparent MgO:Y2O3 Nanocomposite"; J. Am. Ceram. Soc.; p. 1-8; 2013.

\* cited by examiner

NANO DIFFUSER

BACKGROUND

The present disclosure relates to diffusers, and more specifically to nanoparticle diffusers. In optics, diffusers are materials or devices that diffuse or scatter light. Diffusers cause light to spread evenly across a surface, minimizing or removing high intensity bright spots. Diffusers can be used as screens or targets in imaging applications, in sensors, in cameras, or as calibration standards.

Lambertian diffusers are ideal diffusers having an ideal "matte" or diffusely reflecting surface. To an observer, the apparent brightness of an ideal Lambertian surface is the same regardless of the observer's viewing angle. Lambertian diffusers are used as reflectance standards on space sensors, such as Visible Infrared Imaging Radiometer Suites (VI-IRS). Lambertian diffusers are also used as instrument components in space, airborne, tactical, and commercial applications.

Sintered polytetrafluoroethylene (PTFE) (commercially available as SPECTRALON® from Labsphere, Inc., North Sutton, N.H.) is a high reflectance Lambertian diffuser. The reflectance from sintered PTFE diffusers arises from the material's surface and subsurface structure. The porous thermoplastic particle network produces multiple reflections inside the material. The material should be kept free from contaminants to maintain its reflectance properties. However, the open hydrophobic structure of sintered PTFE readily absorbs impurities and contaminants, such as non-polar solvents, greases and oils. Sintered PTFE is also a soft material that is easily scratched and can require extreme care in handling and cleaning. Because it is easily contaminated with organics, sintered PTFE yellows upon exposure to ultraviolet (UV) light when contaminated.

Ground glass that is another example of a diffuser. The surface of ground glass has been mechanically ground and processed to produce a flat but rough, or matte, finish. However, ground glass produces lower signal levels. Ground glass also does not produce a sufficiently optically flat scattered light distribution necessary for many applications.

SUMMARY

According to one embodiment, a method of scattering light includes positioning a Nanocomposite Optical Ceramic (NCOC) diffuser to receive light and scattering the light with the NCOC diffuser, wherein the NCOC diffuser is substantially Lambertian over a waveband range.

In another embodiment, a method of scattering light includes positioning a NCOC diffuser to receive and scatter light.

Yet, in another embodiment, a NCOC diffuser includes two portions, a first portion and a second portion. The first portion substantially scatters light in a first waveband region and transmits light over a second waveband region onto the second portion, and the second portion scatters light and is substantially Lambertian in the second waveband region.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
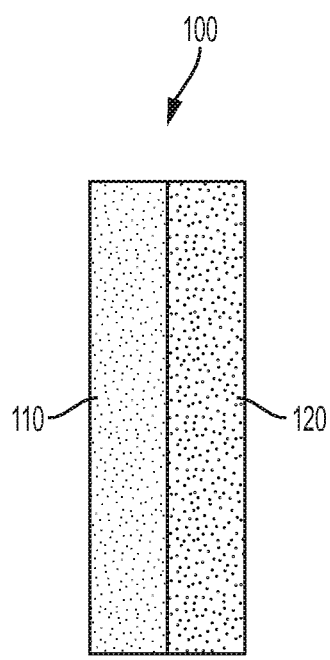
FIG. 1 is a schematic diagram of a broadband diffuser comprising a NCOC portion and a second scattering portion.

Disclosed herein are nano diffusers and methods of scattering light. In one embodiment, a method of scattering light includes positioning a NCOC diffuser to receive light and scatter it, such that the reflected scattered light is sufficiently/substantially Lambertian and of high enough intensity in the waveband of interest for the intended application. The waveband of interest may be in any range over 250 to 2,500 nm.

In another embodiment, a method of scattering light includes positioning a diffuser composed of multiple parts to receive light and scatter it. A first part of the diffuser is comprised of an NCOC diffuser that scatters light in one spectral waveband and transmits in a second spectral band. A second part of the diffuser is composed of one or more other diffusers (e.g., either multi-phase nano diffusers or other types of diffusers) that scatter light in the spectral waveband transmitted by the first part, as well as at other wavebands. The total light scattered by the combination of diffusers is sufficiently/substantially Lambertian and of high enough intensity over the waveband of interest for the intended application. The waveband of interest may be in any range over 250 to 7,000 nm.

As used herein, the articles "a" and "an" preceding an element or component are intended to be nonrestrictive regarding the number of instances (i.e. occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

As used herein, the term "about" modifying the quantity of an ingredient, component, or reactant employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 9, 8, 7, 6, 5, 4, 3, 2, or 1% of the reported numerical value.

As used herein, the term "diffuser" refers to a device that scatters light.

As used herein, the term "bidirectional reflectance distribution function" is a four-dimensional function that defines how light is reflected. The bidirectional reflectance distribution can be measured using American Society for Testing and Materials International (ASTM International) test method E2387-05, Standard Practice for Goniometric Optical Scatter Measurements.

As used herein, the term "bidirectional transmittance distribution function" is a four-dimensional function that defines how light is transmitted. The bidirectional transmittance distribution function can be measured using ASTM International test method E2387-05, Standard Practice for Goniometric Optical Scatter Measurements.

As used herein, the term "transmission" means the passage of light through a medium. Transmissive scattering is the transmission of light through a medium such that the incident ray is transmitted at many angles rather than at just one angle, as in specular transmission.

As used herein, the term "reflection" means the process by which light is returned either at the boundary between two media (surface reflection) or at the interior of a medium (volume reflection). Reflective scattering is the reflection of light from a surface such that an incident ray is reflected at many angles rather than at just one angle as in the case of specular reflection. An illuminated reflecting surface whose apparent radiance (which can be measured in units of photons/(s·cm²·steradian) to an observer is substantially the same regardless of the observer's angle of view in the half-space adjacent to the surface is called a "Lambertian" reflector. Whether a material is Lambertian can be determined by measuring the bidirectional reflectance/transmission distribution (see above).

The NCOC diffuser disclosed herein has many advantages compared to current scattering methods. The NCOC diffuser is a robust, readily cleanable material with excellent diffusing capability with the potential to replace existing solutions. The NCOC diffuser has a low sticking coefficient of organic contaminants. The NCOC diffuser also will not degrade in the presence UV light. Although organic contaminants may degrade in the presence of UV, the impact is limited due to the nature of the NCOC diffuser surface.

The NCOC diffuser can be used for both reflective and transmissive scattering. For instance, if it is transparent at infrared (IR) wavelengths, then it can be layered or combined with an IR diffuser to provide a broadband diffuser with reflective scattering capabilities in both the visible and infrared (IR) wavelength regions.

NCOCs are used as windows (domes) for vehicles, such as missiles, and provide optical transparency in a particular waveband of interest. Because transparency is desired, any light scattering, and resultant opacity, that occurs is disfavored and not desired. Various methods to reduce and eliminate scattering in these regions have been used to extend the range of transmittance.

However, as disclosed herein, a NCOC diffuser is used to scatter light in the visible and near IR regions upon receipt from a source of light. The NCOC diffuser can be an instrument component in a space, airborne, or tactical application that requires stable surfaces whose scattering is Lambertian enough for the intended application. The diffuser can be used as a reflectance standard in any optical or commercial application. Because the diffuser is stable, it can be used as a calibration surface, without the need to monitor or other special techniques for on-orbit calibration. For tactical and airborne applications, the NCOC diffuser is easily cleanable and reusable. Further, because no modifications are needed for use as a reflective diffuser, it is easy to make and use.

In contrast to sintered PTFE, NCOC diffusers are easy to clean and keep clean because they do not readily absorb contaminants. Also unlike other diffusers, NCOC diffusers do not rely on voids between the nanoparticles that prevent mechanical stability. The disclosed diffusers do not have to be supported on another material and can stand alone. Although, in some embodiments, the diffuser can be supported on another material. Other advantages of the NCOC diffusers include high mechanical strength and hardness properties, which are comparable or better than sapphire.

A NCOC diffuser includes a mixture of materials, which can be any nanograins or nanoparticles. For example, the NCOC diffuser can include magnesia (magnesium oxide, MgO) nanoparticles or nanograins and yttria (yttrium oxide, $Y_2O_3$) nanoparticles or nanograins. The nanoparticles are dispersed or intermixed with one another to form a nanocomposite. Although, the individual nanoparticles (e.g., MgO and $Y_2O_3$) maintain their chemical distinctness, or remain in separate phases. The nanocomposite is not embedded in a macro background, which eliminates issues inherent when using macro-sized grains, such as strength-reducing processing flaws.

The individual nanoparticles of the NCOC each have a grain size of submicron dimensions. Particle size has an impact on the specular cutoff. In particular, the specular cutoff moves to lower wavelengths with decreasing particle size. Then, at wavelengths longer than the specular cutoff, the light is substantially specular transmission or reflection, with minimal bulk absorption or scattering. However, increasing the grain/particle size moves the specular cutoff to longer wavelengths and broadens the region of Lambertian scatter. Thus, the properties of the NCOC diffuser can be tailored depending on the particle size, and increasing particle size will increase the wavelength range for use as a reflective diffuser.

The volume ratios of constituent materials of the NCOC (such as MgO and $Y_2O_3$) can generally vary and are not intended to be limited. The relative percentages of the constituent nanograins can be varied to achieve different optical properties, strength, and thermal conduction. In one embodiment, a NCOC including MgO:$Y_2O_3$ nanoparticles includes between about 90:10 and about 10:90 by volume MgO and $Y_2O_3$ nanoparticles.

Depending on the volume ratio of constituent nanograins, the diffuser's density can generally vary. For example, an 80:20 by volume ratio of MgO and $Y_2O_3$ has a density of about 3.8 grams/centimenter³ ($g/cm^3$), and a 50:50 by volume ratio of MgO and $Y_2O_3$ has a density of about 4.3 $g/cm^3$. For comparison, SPECTRALON (sintered polytetrafluoroethylene (PTFE)) has a lower variable density of about 1.25 to 1.8 $g/cm^3$.

The thickness of the NCOC diffuser can be varied to use the diffuser as either a transmissive diffuser or a reflective diffuser. The NCOC diffuser relies on particle surface scattering for performance. Thus, decreasing the thickness will change the relative amount of transmitted and reflected diffuse light.

The NCOC diffuser can be combined with another diffusing material to provide a diffuser with extended wavelength diffusion capabilities. For example, the NCOC diffuser can be combined with an IR diffusing material, such as a roughened gold material (e.g., commercially available as INFRAGOLD from Epner Technology, Inc., Brooklyn, N.Y.). Thus, combining the NCOC diffuser, which diffuses out to about 2,500 nm and is transparent from 3,000-7,000 nm, with an IR diffusing surface, which has diffuse reflectance at longer wavelengths, e.g., 2,500, 3,000, 3,500, 4,000, 4,500, 5,000, 5,500, 6,000, 6,500, and 7,000 nm, results in a reflective diffuser in the 250-7,000 nm wavelength range. Such wide wavelength diffusers are advantageous as potential combination calibrators in space applications or other sensors and devices, such as in VIIRS.

The NCOC diffuser can be made by any methods known in the art. One exemplary method for making the NCOC diffuser includes powder fabrication and preparation, near net shape forming, and final shape finishing. Fabrication and preparation may use a Flame Spray Pyrolysis (FSP) to provide a precursor solution of nanoparticles to make the NCOC. Other techniques may also be employed to provide the precursor solution, which is de-agglomerated, e.g., ground and mixed with a mill, to break up any clumps. The solution is then filtered to remove impurities and any residual large particles from the solution. The solution is granulated to remove the liquid solution to form a dry powder. Near net shape forming may be accomplished using a dry press process in which the powder is packed into a mold of the desired shape and pressure is applied to produce a green body of the desired near net shape. A sintering process applies heat to densify the green body. A hot isostatic press applies heat and pressure to complete densification and eliminate any remaining voids to make a fully shape. Final shape finishing includes precision grinding and roughening of the surface of the NCOC diffuser to the finished shape and characterization of the NCOC diffuser's mechanical and optical properties to verify the diffuser meets the desired specifications.

The NCOC diffuser can be formed into any desired shape, depending on the application. For example, the NCOC diffuser can be in the form of a strip shape, a disk shape, a hemispherical shape (concave or convex), a dome shape, or any combination thereof.

In one aspect, the NCOC diffuser is substantially Lambertian over the range of about 200 to about 2,500 nm. In another aspect, NCOC diffuser reflects at least 20% of the electromagnetic over the range of 250 to 2,500 nm. Yet, in another aspect, the NCOC diffuser reflects at least 50% of the light over the range of 250 to 2,500 nm. Still yet, in another aspect, the NCOC diffuser reflects at least about or any range between about 20, 30, 40, 50, 60, 70, 80, and 90% of the light over the range of 200 to 2,500 nm.

Referring to FIG. 1, a broadband diffuser 100 includes two parts, a first portion 110 disposed onto a second portion 120. The first portion 110 scatters light in one spectral waveband and transmits light in another spectral waveband. The first portion can be an NCOC. The second portion 120 (either another NCOC or different diffuser) scatters light in the waveband transmitted by the first portion 110. The second portion 120 can also transmit light scattered by the first portion. The first and second portions can be substantially Lambertian in scattered waveband region.

The NCOC portion 110 can be combined with any other scattering portion (either a different NCOC or a different type of diffuser entirely) to provide a broadband diffuser, which is substantially Lambertian over a broader wavelength range. The NCOC can be disposed onto, deposited onto, or combined with another scattering portion. Upon such combination, the diffuser can scatter light over a broad waveband.

In one embodiment, a NCOC diffuser includes two portions, a first portion and a second portion. The first portion substantially scatters light in a first waveband region and transmits light over a second waveband region onto the second portion, and the second portion scatters light and is substantially Lambertian in the second waveband region. The first waveband region is between about 250 and about 2,500 nm. The second waveband region is between about 2,500 and about 7,000 nm. The second portion can be an IR scattering portion.

Figure 2:
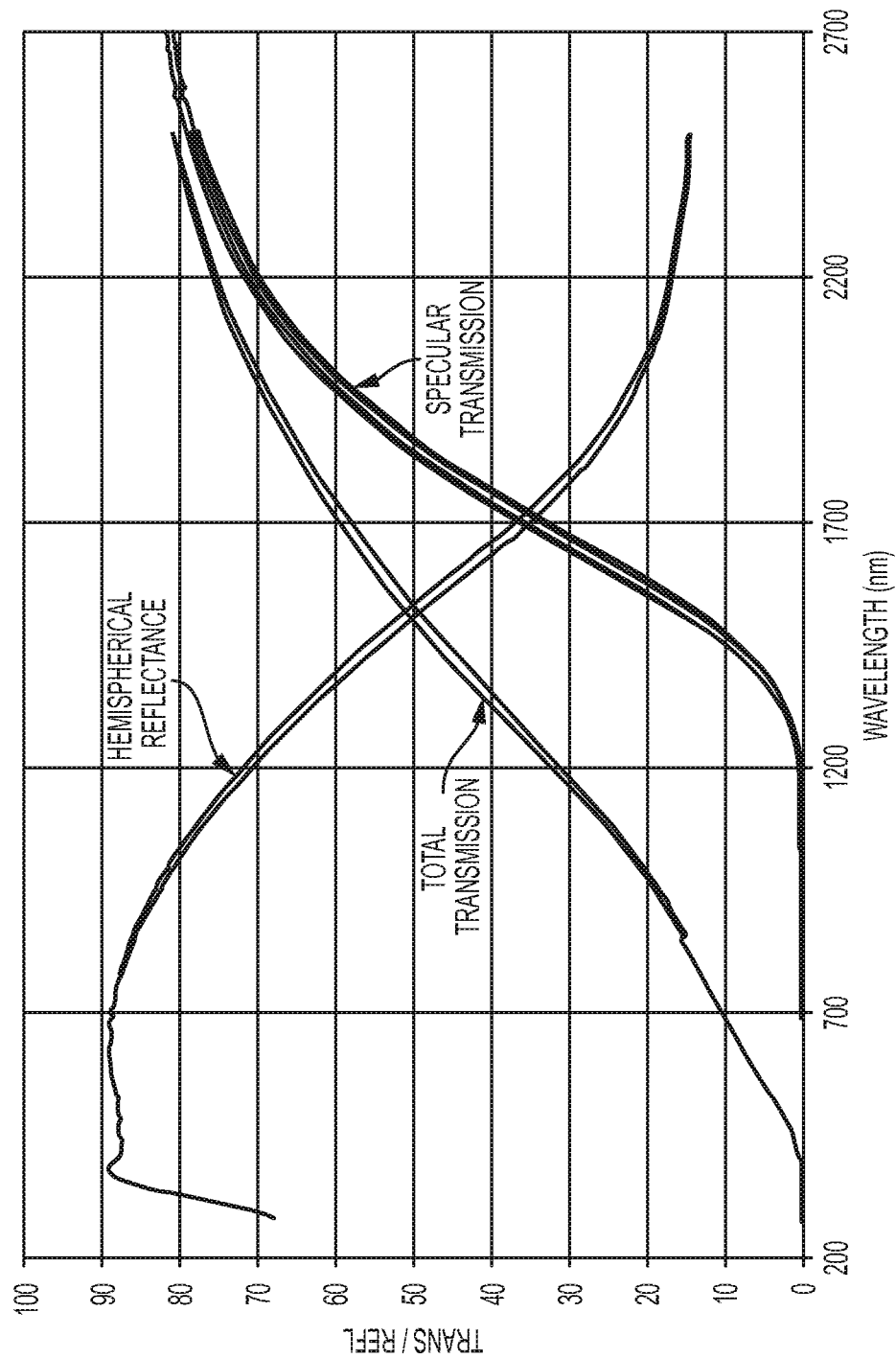
FIG. 2 is a graph illustrating transmission and reflection of a NCOC diffuser.

FIG. 2 is a graph illustrating transmission and reflection of the NCOC diffuser disclosed herein. Transmission and reflection is shown as a function of wavelength (nm). As shown, the specular transmittance portion of the total transmittance starts dropping below about 2,500 nm. As the specular transmission portion of the total transmission decreases, the scattering transmission increases. At lower wavelengths, an increasingly larger portion of light is scattered or reflected.

Figure 3:
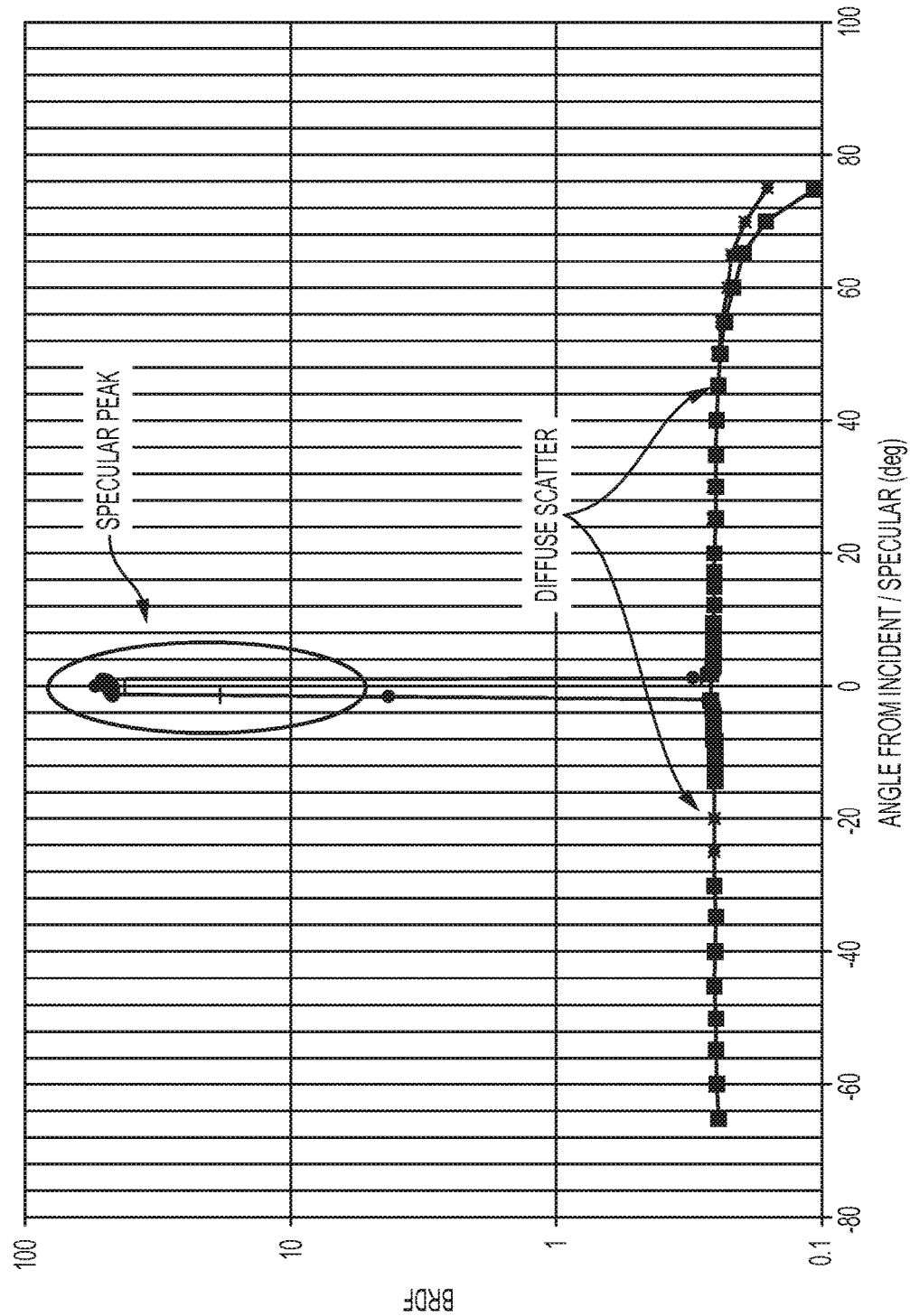
FIG. 3 is a graph illustrating reflective scattering of a NCOC diffuser.

FIG. 3 is a graph illustrating reflective scattering of a polished NCOC diffuser. Bidirectional reflectance distribution function (BRDF) is shown as a function of angle of incidence/specular (degrees). As shown by the substantially flat reflectance signal (substantially Lambertian), the diffuser has excellent Lambertian reflection except for a specular reflection peak. However, for use as the NCOC diffuser as disclosed herein, the specular reflection peak can be removed by sanding or roughening the surface of the NCOC diffuser. Roughening or sanding can be performed by any methods known in the art. The relatively flat reflected signal resembles that of a volume diffuser, such as sintered PTFE powder or $BaSO_4$. Further, minimal light absorption by constituents results in light being redirected at particle boundaries, which exits either on the incident surface, the exit surface, or the edges.

Figure 4:
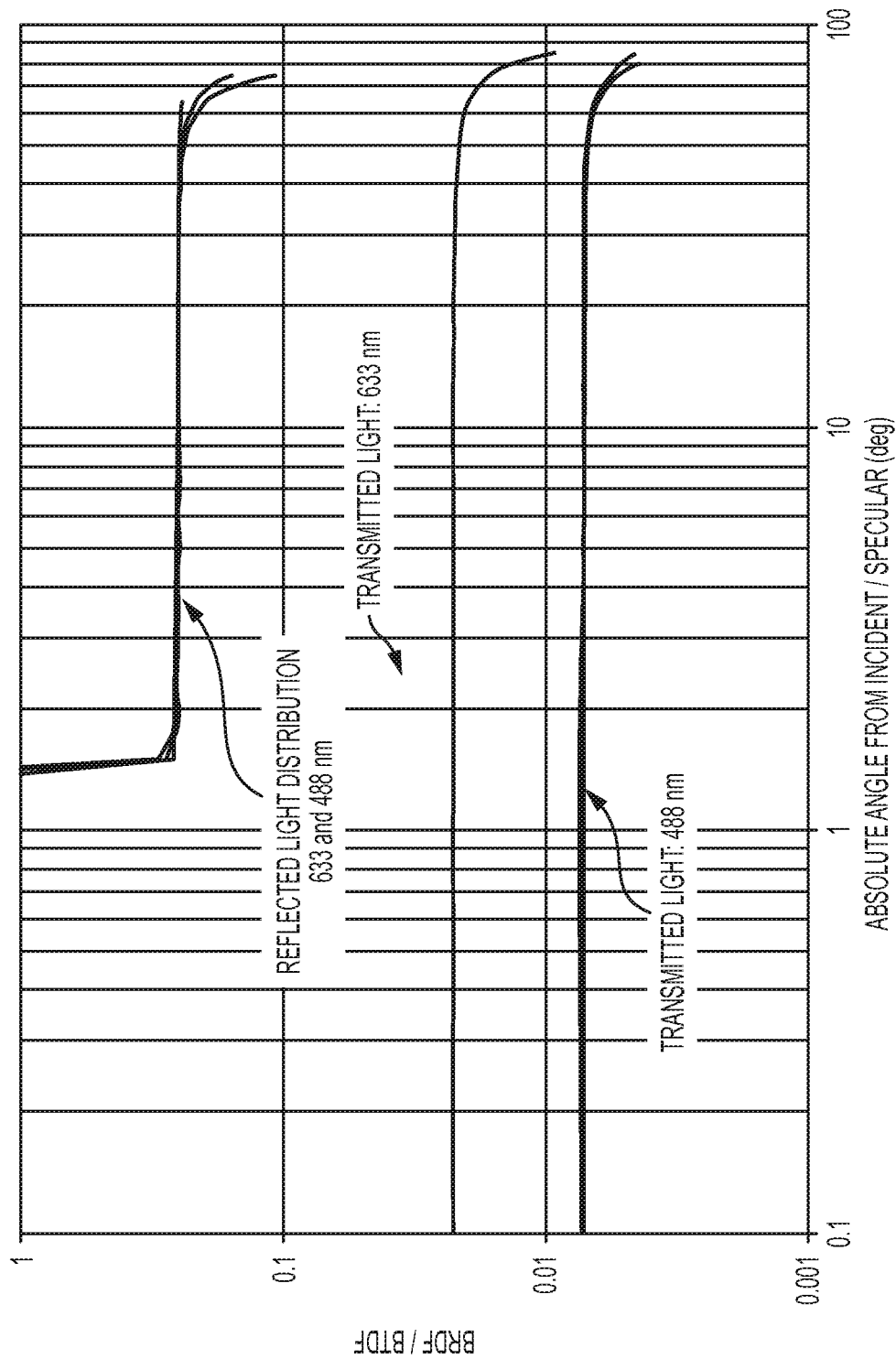
FIG. 4 is a graph illustrating the reflected and transmitted scattered light distribution of a NCOC diffuser.

FIG. 4 is a graph illustrating the reflected and transmitted light distribution of the polished NCOC diffuser. The BRDF and bidirectional transmittance distribution function (BTDF) are shown as a function of absolute angle from incidence or specular (degrees). As shown, both reflected and transmitted light distributions are substantially flat (substantially Lambertian), except for the specular peak in reflection at 488 and 633 nm. Scattered transmitted light is substantially Lambertian even in the specular transmission region. As mentioned above the NCOC diffuser can be sanded or roughened to reduce or remove the specular peak to provide the full effect of a particle based volume diffuser. The data show that the NCOC diffuser is an excellent diffuser with a BRDF of about 0.25 l/steradians, compared to the ideal (Lambertian) value of about 0.32 l/steradians. At 1,064 nm, the NCOC diffuser still shows Lambertian scatter. Reducing the thickness of the NCOC diffuser will increase transmitted and decrease reflected light.

To scatter light in any desired application, the NCOC diffuser is positioned to receive light from a light source. The light source can be a laser, a light-emitting diode (LED), tungsten halogen light bulb, xenon arc lamp, or other light source. The light source can emit light of any wavelength range and is not intended to be limited. In one example, the light source can emit light having a wavelength in a range of 200 and 7,000 nm. The light source then emits light onto the NCOC diffuser to scatter the light as described herein.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method of scattering light, the method comprising:
   roughening a surface of a nanocomposite optical ceramic (NCOC) diffuser, the NCOC diffuser consisting of nanoparticles;
   positioning the NCOC diffuser to receive light from a light source; and
   scattering the light with the NCOC diffuser;
   wherein the NCOC diffuser scatters light over a waveband range from about 250 to about 2,500 nanometers (nm) and is substantially Lambertian over the waveband range.

2. The method of claim 1, wherein the NCOC diffuser comprises MgO nanoparticles.

3. The method of claim 2, wherein the NCOC diffuser further comprises $Y_2O_3$ nanoparticles.

4. The method of claim 1, wherein the NCOC diffuser is a reflective diffuser.

5. The method of claim 1, wherein the NCOC diffuser is a transmissive diffuser.

6. The method of claim 1, wherein the NCOC diffuser is a reflectance standard.

7. The method of claim 1, wherein the NCOC diffuser is an instrument component in a space, an airborne, or a tactical application.

8. A NCOC diffuser, comprising:
   a first discrete layer comprising nanoparticles and being substantially free of voids between the nanoparticles, the first discrete layer having a roughened surface; and
   a second discrete layer arranged in direct contact with the first discrete layer;
   wherein the first discrete layer scatters light over a first waveband region from about 250 to about 2,500 nm, is substantially Lambertian over the first waveband region, and transmits light over a second waveband region from about 2,500 to about 7,000 nm onto the second discrete layer; and
   wherein the second discrete layer scatters light over the second waveband region, and is substantially Lambertian over the second waveband region.

9. The NCOC diffuser of claim 8, wherein the second discrete layer is an IR scattering layer.

10. The NCOC diffuser of claim 8, wherein the first discrete layer, the second discrete layer, or a combination thereof comprise a NCOC.

11. The NCOC diffuser of claim 8, wherein the NCOC diffuser comprises MgO nanoparticles, $Y_2O_3$ nanoparticles, or a combination thereof.

12. The NCOC diffuser of claim 8, wherein the second discrete layer comprises gold.

* * * * *